March 20, 1934.  J. ZYLSTRA  1,951,855
HEATER
Filed July 2, 1931
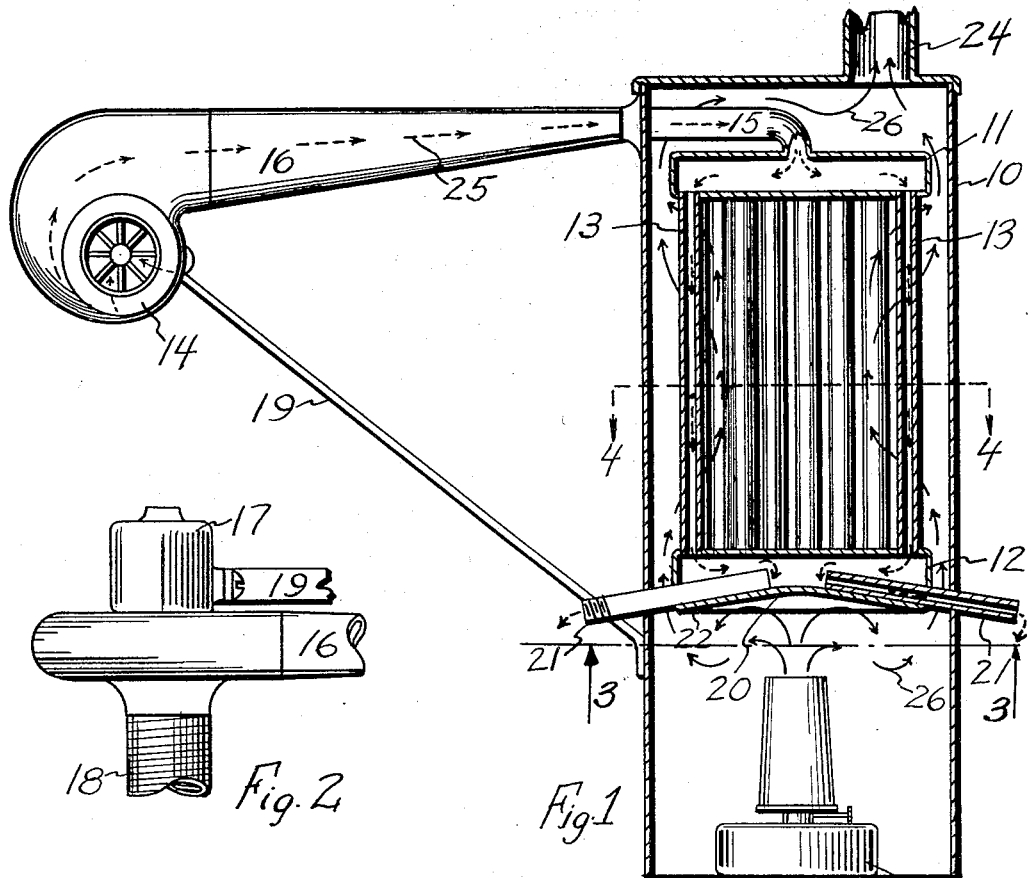
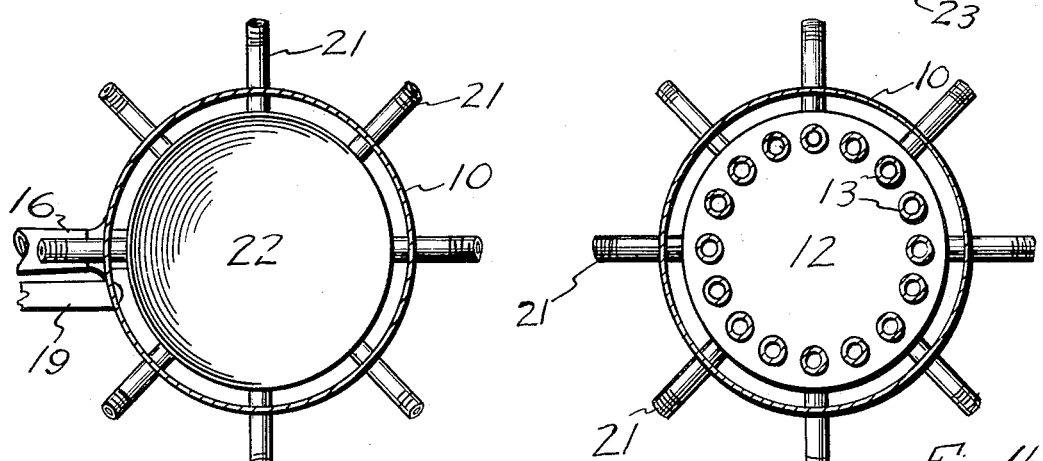
INVENTOR.
Joseph Zylstra
Lynn H. Latta
BY
ATTORNEYS.

Patented Mar. 20, 1934

1,951,855

UNITED STATES PATENT OFFICE 1,951,855

HEATER

Joseph Zylstra, Ashton, Iowa

Application July 2, 1931, Serial No. 548,346

7 Claims. (Cl. 126—110)

My invention relates to heaters and has for its object to provide a suitable heater which can be used in connection with a simple heating device, such as a lamp form of heater, or any type of small, practical heater unit.

A further object of my invention is to provide a gradual heating means for air in motion in which cooler air currents are gradually heated by hot gases to the maximum heat desired, and in this way attain the result of having hot air containing the greatest possible amount of heat energy.

Another object of my invention is to provide a simple and efficient heater with a minimum of parts and a maximum of efficiency.

A further object of my invention is to provide a heater which can be used in connection with brooders.

A still further object of my invention is to provide such a heater which is simple, durable, and inexpensive in construction.

Another object of my invention is to provide a heater in which the heat can be conveniently controlled.

With these and other objects in view, my invention consists in the construction, arrangement, and combination of the various parts of my device whereby the objects contemplated are attained, as hereinafter more fully set forth, pointed out in my claims, and illustrated in the accompanying drawing, in which:

Figure 1 is a sectional view of the heater, which is cylindrical in form, taken along its axis and parallel to the blower unit, Figure 2 is a plan view of the blower with motor attached, Figure 3 is a bottom view of a section of the heater taken along the line 3—3 of Figure 1, and Figure 4 is a plan view of the same taken on the line 4—4 of Figure 1.

I have used the reference character 10 to indicate the outer shell of the heater which is cylindrical in shape.

This heater comprises an upper drum 11 and a lower drum 12, both of which are connected by a series of open tubes 13 and which tubes open into the drums 11, 12.

The upper drum 11 is connected to a blower 14 by means of the pipe 15 and the flue 16.

The blower 14 is driven from the motor 17. It will be understood that the blower described and illustrated in connection with this heater is of the conventional type of blower and does not form a part of the invention herein described and claimed.

The air intake duct is shown at 18.

The blower unit 14 is supported from the shell 10 by means of the bracket 19 which is suitably attached to the motor 17.

The bottom of the lower drum 12 in the heater is made slightly conical with its apex slightly rounded as shown at 20. Open-end tubes 21 are rigidly attached to the lower plate 22 inside the drum 12. These tubes are fastened as close to the apex 20 of the plate 22 as is practical. The tubes 21 are brought out through the shell 10 radially as shown in Figures 3 and 4. These tubes can be left open at their outer extremities as in the case of a heater being used for brooders, or can be attached to other pipes when it is desired to conduct hot air to a distance away.

Resting upon the bottom of the shell 10 is the lamp or other heating means 23.

A flue 24, for allowing the heated gases from the burner to escape, is provided at the top of the shell 10.

The tubes 13 which connect the drums 11, 12, are secured to the drums about the maximum limits of their circumferences. This is more clearly shown in Figure 4.

In operation, the heater functions as follows; the blower 14, which is driven from the motor 17, forces the cold air up through the flue 16, thence through the pipe 15 into the hollow upper drum 11, down through the tubes 13 into the lower drum 12, and out through the tubes 21. The course of these currents is indicated by the dotted arrows 25.

At the same time as these air currents are passing through the heater in the aforementioned manner, the hot gases which are indicated by the solid arrows 26 which arise from the heating means 23, first strike the apex of the plate 22 of the drum 12. These gases then travel laterally outward from said apex and up above the periphery of the drum 12, and thence up and around the outside of the tubes 13 and out through the flue 24.

It will be noted from this description that the colder air, as soon as it enters the upper drum 11 and begins to pass downwardly through the tubes 13, begins to be slightly warmed by the rising gases 26. As the air continues to travel in a downward direction, it comes into contact with the hotter portions of the gases 26 through the medium of the walls of the tubes 13 and by the time the downwardly traveling air reaches the lower drum 12 it is quite hot.

Then, these air currents, which must travel to and across the center of the drum 12 before they can be released through the outlets consisting of the tubes 21, in this manner pass over the hottest portion of the lower drum which is at the apex 20. This insures the absorption of the greatest possible amount of heat and then the hot air is forced out through the pipes 21 as previously described.

It will be seen in connection with this heater that by spacing the tubes 13 between the drums 11, 12 as far out on their circumferences as possible, the hot gases 26 will pass around these tubes and at the same time give up a maximum of their heat energy to the tubes.

It will also be seen that by constructing the lower plate 22 of the drum in the form of a cone, that the hot gases 26 must first impinge against the apex of this cone and by virtue of this conical arrangement be held against the said apex briefly before traveling up and around the lower drum 12. This provides an ideal arrangement for storing heat at a vital spot in the lower drum 12. A flat plate would not have the same characteristics. Means for controlling the heat is effected by the simple adjustment of the heater 23, or in the case of a heater used in connection with a brooder where a lamp type heater is used, this adjustment can be secured by simply raising or lowering the wick of the lamp.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a blower, a heater comprising an upper and a lower drum provided with a plurality of upstanding tubes therebetween and arranged circumferentially on the faces of said drums, a flue inclosing the blower and providing communication between said blower and said upper drum, said upstanding tubes providing communication therefrom to said lower drum, a plurality of outlet tubes projecting radially from within said lower drum, a heating element positioned beneath said lower drum, a shell inclosing said upper and lower drum, said upstanding tubes, said heating element, and said outlet tubes, the outlet tubes projecting beyond the shell wall, and a bracket attached to said shell providing support for said blower.

2. A heater comprising an upper and lower hollow drum, a plurality of vertical tubes arranged circumferentially about the faces of the drums and attached thereto, means for forcing air through the tubes, and means for heating the tubes, including a heating means positioned on the axis line of the drums to allow heated gases to pass upwardly and about the tubes, and said lower drum including a lower conical-shaped plate, the apex of said plate positioned on the axis line of the heating means.

3. A heater comprising an upper and lower hollow drum, a plurality of vertical tubes arranged circumferentially about the faces of the drums and attached thereto, means for forcing air through the tubes, and means for heating the tubes, including a heating means positioned on the axis line of the drums to allow heated gases to pass upwardly and about the tubes, and said lower drum including a lower conical-shaped plate, the apex of said plate positioned on the axis line of the heating means, and upwardly disposed thereto to provide a concentration of heat at the said apex.

4. A heater comprising an upper and lower hollow drum, a plurality of vertical tubes arranged circumferentially about the faces of the drums and attached thereto, means for forcing air through the tubes, and means for heating the tubes, including a heating means positioned on the axis line of the drums to allow heated gases to pass upwardly and about the tubes, and said lower drum including a lower conical-shaped plate, the apex of said plate positioned on the axis line of the heating means, and upwardly disposed thereto to provide a concentration of heat at the said apex, and a plurality of horizontal, and radially arranged tubes attached about the outer periphery of the lower drum, the inner ends of said tubes being positioned substantially at the apex of the conical plate.

5. A heater comprising an upper and lower hollow drum, a plurality of vertical tubes arranged circumferentially about the faces of the drums and attached thereto, means for forcing air through the tubes, and means for heating the tubes, including a heating means positioned on the axis line of the drums to allow heated gases to pass upwardly and about the tubes, and said lower drum including a lower conical-shaped plate, the apex of said plate positioned on the axis line of the heating means, and upwardly disposed thereto to provide a concentration of heat at the said apex, and a plurality of horizontal, and radially arranged tubes attached about the outer periphery of the lower drum, the inner ends of said tubes being positioned substantially at the apex of the conical plate, said radial tubes providing exit means for heated air.

6. A heater comprising a shell including an upper flue, a blower attached to the shell, an upper and lower hollow drum supported within the shell, said blower communicating with the upper drum, a plurality of vertically arranged tubes attached between the drums and on the outer circumferences thereof, and means for heating the drums and tubes positioned beneath the lower drum, and said lower drum including a lower conical-shaped plate, the apex of said plate positioned on the axis line of the heating means and upwardly disposed thereto, to provide a concentration of heat at the apex.

7. A heater comprising a shell including an upper flue, a blower attached to the shell, an upper and lower hollow drum supported within the shell, said blower communicating with the upper drum, a plurality of vertically arranged tubes attached between the drums and on the outer circumferences thereof, and means for heating the drums and tubes positioned beneath the lower drum, and said lower drum including a lower conical-shaped plate, the apex of said plate positioned on the axis line of the heating means and upwardly disposed thereto, to provide a concentration of heat at the apex, and a plurality of horizontal, and radially arranged tubes attached about the outer periphery of the lower drum, the inner ends of said tubes being positioned substantially at the apex of said conical plate to allow passage of heated air to a distance.

JOSEPH ZYLSTRA.